(12) United States Patent
Boucher

(10) Patent No.: US 6,310,538 B1
(45) Date of Patent: *Oct. 30, 2001

(54) PROCESS OF ACCESS RESTRICTION TO A TELECOMMUNICATIONS NETWORK, TELECOMMUNICATIONS SYSTEM AND UNIT FOR SUCH A SYSTEM

(75) Inventor: Pierre-Hugues Boucher, St. Avertin (FR)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,619
(22) PCT Filed: Apr. 21, 1997
(86) PCT No.: PCT/IB97/00419
 § 371 Date: Dec. 5, 1997
 § 102(e) Date: Dec. 5, 1997
(87) PCT Pub. No.: WO97/41707
 PCT Pub. Date: Nov. 6, 1997

(30) Foreign Application Priority Data

Apr. 29, 1996 (FR) .................................................. 96 05363

(51) Int. Cl.⁷ .................................................. G06F 7/00
(52) U.S. Cl. .................. 340/5.8; 340/5.2; 380/227; 380/229; 713/200; 709/229

(58) Field of Search .......................... 340/825.34, 825.31, 340/5.2, 5.8, 5.74; 380/23, 25, 227, 229; 713/200, 201, 202; 709/229; 455/410, 411

(56) References Cited

U.S. PATENT DOCUMENTS

| | | | |
|---|---|---|---|
| 5,661,807 | * | 8/1997 | Guski et al. ............................ 380/25 |
| 5,668,876 | * | 9/1997 | Falk et al. ....................... 340/825.31 |
| 5,761,309 | * | 6/1998 | Ohashi et al. ......................... 380/25 |
| 5,764,890 | * | 6/1998 | Glasser et al. ........................ 380/25 |

FOREIGN PATENT DOCUMENTS

| | | | |
|---|---|---|---|
| 514489A | 1/1993 | (JP) | ................................ H04M/1/66 |
| WO9600485 | 1/1996 | (WO) . | |

OTHER PUBLICATIONS

"The complete solution for cordless access", published in Philips Telecommunication Review, vol. 52, No. 3, Jan. 1995.

* cited by examiner

Primary Examiner—Brian Zimmerman
Assistant Examiner—Yves Dalencourt
(74) Attorney, Agent, or Firm—Dicran Halajian

(57) ABSTRACT

The invention relates to a process of restriction the access of a terminal to a telecommunication network. The invention includes using the current user authentication procedure usually implemented in telecommunications systems for authenicating users, so as to verify the users's rights of access in relation to certain criterions, such as, the destination of the call, its time, and its duration.

11 Claims, 2 Drawing Sheets

PROCESS OF ACCESS RESTRICTION TO A TELECOMMUNICATIONS NETWORK, TELECOMMUNICATIONS SYSTEM AND UNIT FOR SUCH A SYSTEM

BACKGROUND OF THE INVENTION

The invention relates to a process of restricting access to a telecommunications network of a first unit of a telecommunications system, said access being managed by a second unit of said telecommunications system, and said telecommunications system including an authentication procedure of said first unit by said second unit.

The invention likewise relates to a telecommunications system comprising at least a first and a second unit, said second unit notably including means for managing the access of said first unit to a telecommunications network, and authentication means of said first unit.

The invention finally relates to a central unit of a telecommunications system comprising at least one other unit said central unit having managing means for managing the access of said other unit to a telecommunications network, and authentication means for authenticating said other unit.

The invention has highly significant applications in the field of telecommunications, notably within the scope of the DECT standard for professional or private PABX applications.

The abstract of Japanese Patent Application JP-A-05 014 489 describes a circuit which permits of restricting the access for incoming or outgoing calls as a function of the respective time range.

OBJECTS AND SUMMARY OF THE INVENTION

It is an object of the present invention to propose a simple procedure permitting the restriction of the access as a function of a large variety of criterions without the necessity of the use of specific means. By way of example, the invention permits of restricting the access to a telecommunications network as a function of time, destination of the call; its duration . . . .

Therefore, a process according to the invention of restricting access to a telecommunications network and as defined in the opening paragraph is characterized in that it comprises the implementation of said authentication procedure.

The invention is thus particularly advantageous in notably all the mobile telecommunications systems in which user authentication procedures are defined.

For restricting said access as a function of at least one predefined criterion, in a particularly advantageous embodiment the process according to the invention notably-comprises assigning a code called access code to each of these criterions and it uses said access code as a key which, applied to said authentication procedure, permits of determining the rights of said first unit in relation to said criterion.

By way of example, a process according to the invention notably comprises:
 transmitting an authentication request from said second unit to said first unit,
 calculating a first and a second authentication result at the level of said respective first and second units, by utilizing said access code as a key, said access code previously being entered by a user at the level of said first unit,
 transmitting said first result from said first unit to said second unit,
 comparing said first and second results at the level of said second unit to determine whether said first unit has right of access in relation to said criterion.

The process according to the invention is applied notably in an advantageous manner to the DECT standard defined by ETSI (European Telecommunications Standard Institute). In this case, it advantageously implements the procedure called "user authentication" defined in the part GAP (Generic Access Profile; ETSI 300444) of this standard.

A standardized use of such a process within the scope of a mobile telephony standard offers the additional advantage of permitting an interoperability between mobile units and base units from different manufacturers.

These and other aspects of the invention will be apparent from and elucidated with reference to the embodiments described hereinafter.

DETAILED DESCRIPTION OF THE PREFERRED EMBODIMENT

In the following of the description, a process and a system according to the invention will be described within the scope of the DECT mobile telephony standard defined by ETSI. However, the invention is applicable to any other telecommunications system having a user authentication procedure (CT2, GSM, ETACS, TETRA . . . ).

Figure 1:
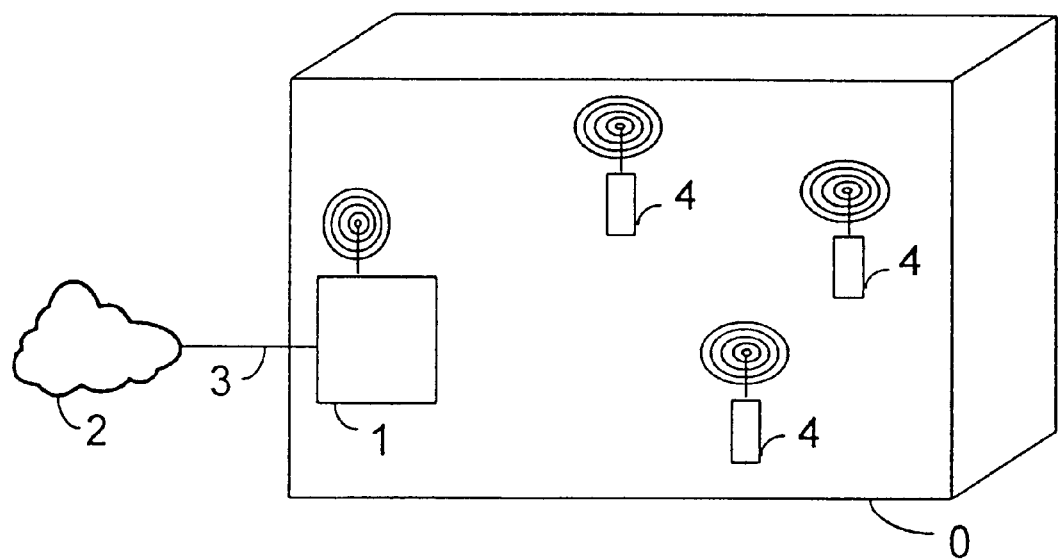
FIG. 1 represents an example of a telecommunications system according to the invention.

According to FIG. 1, a telecommunications system according to the invention comprises, installed inside a dwelling 0 or an office, for example, a base unit 1 linked to the public telecommunications network 2 by a cable 3, and a plurality of mobile terminal units 4 inside the building 0 and communicating with the base unit by radio. Such systems are notably described in the article entitled "The complete solution for cordless access", published in "Philips Telecommunication Review", Vol. 52, No. 3 January 1995.

The invention notably relates to the restriction of access of units 4 to the telecommunications network 2 as a function of predefined criterions. By way of example, these criterions are notably the time of the call, its destination, its duration . . . . For example, for professional applications, the access to the network is likely to be restricted to certain time ranges corresponding to the normal hours in which staff is present. It is also likely to be restricted to certain countries. For domestic applications, for example, the process according to the invention notably permits of checking the duration of calls.

In this example, the base unit 1 plays the role of second unit and the mobile units 4 play the role of first units.

Figure 2:
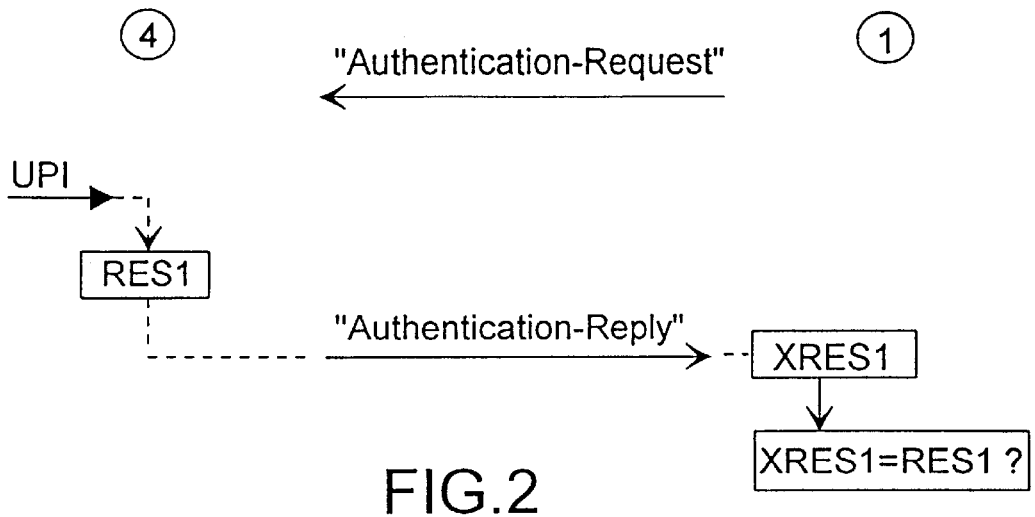
FIG. 2 represents a simplified diagram explaining the operation of the "user authentication" procedure of the DECT standard.

In FIG. 2 is described in a diagram the authentication procedure provided in the part GAP of the DECT standard (ETSI 300444). This authentication procedure is provided in the standard to permit the authentication of a user for, for example, bank applications. The user has a personal code called UPI (User Personal Identifier). When a base unit wishes to obtain a signature from the user of a mobile unit, it transmits thereto a request "authentication request" whose format is described in the standard cited above.

On its part, said mobile unit receives the request "authentication request".

It calculates a first authentication result RES1 based on the UPI code entered by the user via the keypad of the unit. Then the mobile unit sends a reply "authentication reply" containing said first result to the base unit.

The base unit then calculates a second authentication result XRES1 based on the UPI code assigned to said mobile unit, after which the base unit compares said first and second results RES1 and XRES1. The user is correctly authenticated when they are the same.

The authentication results RES1 and XRES1 are calculated in accordance with Recommendation ETS 300175–7: The UPI code is combined with a key hidden to the user and stored in a memory before being applied, together with other data generated at random and transmitted to the other unit in the request or reply messages, to a calculating unit for calculating an authentication algorithm called DSAA (DECT Standard Authentication Algorithm).

The invention notably has for its object to apply this procedure to the access restriction for mobile units to the telecommunications network.

Therefore, a certain number of access criterions are defined and an access code is assigned to each of these criterions. The users which have rights of access in relation to said criterions are in possession of the corresponding access codes.

Figure 3:
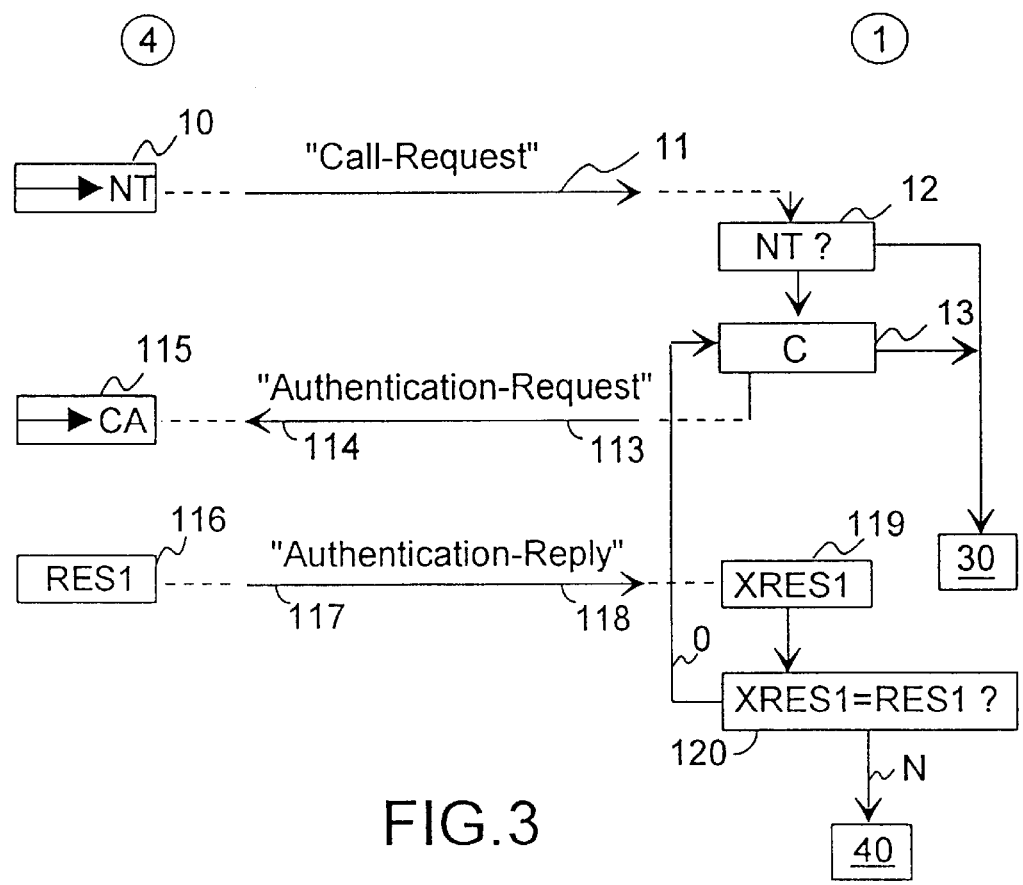
FIG. 3 represents an example of an access restriction process according to the invention.

The process according to the invention will now be described with reference to FIG. 3 for a first embodiment.

In step 10, a user dials a telephone number NT on the keypad of his unit 4. The unit 4 then starts the communication by emitting a message "call request" to the base unit 1.

In step 11, the base unit receives this message. It then analyzes the called number contained in this message in step 12 to determine whether it is an emergency number. Indeed, in an advantageous embodiment of the invention, certain emergency numbers are defined for which the procedure of network access restriction and access control is not implemented. They are, for example, the telephone numbers of the fire brigade, the police . . . . Thus, if the number of the called unit is an emergency number, the base unit directly goes over to step 30 where the call is processed. In the opposite case, the process according to the invention continues with step 13.

In step 13, the base unit runs through a list of defined criterions by verifying whether they can be applied. And for each criterion C that can be applied, it performs the operations corresponding to steps 113 to 120. When the list has been completed, this means that the access has been given for all the defined criterions, and the operation carries on with step 30.

By way of example, verifying whether a criterion is applicable comprises:

for a criterion relating to the destination of the call, verifying whether the formed number is likely to be forbidden (for example, if one seeks to check the international access code, one verifies whether the compound number starts with 19 and if this is not the case, the access is authorized and the operation carries on directly to box 30), for a criterion relating to the time of call, verifying the time given by the clock of the base unit (if one is in a time range during which the access is not checked, the operation directly proceeds to box 30).

In step 113, the base unit sends an authentication request "authentication request" to the calling user. In another advantageous embodiment, an audio signal and/or an advice is sent to the base unit beforehand to warn the user and ask him to enter the access code that corresponds to said criterion. In practice, this audio signal and this advice are transmitted in messages CC-INFO whose INFORMATION ELEMENT field is equal to <<SIGNAL>> for the audio signal and to <<MULTIDISPLAY>> for the advice, respectively.

In step 114, the mobile unit receives this request. In step 115, the user enters said access code CA and, in step 116, the mobile unit calculates a first authentication result RES1 by utilizing this code as a key instead of the identification code UPI. In step 117, this result RES1 is sent to the base station in a message "authentication reply".

This reply is received by the base unit in step 118. In step 119, it calculates a second authentication result XRES1 based on the access code that corresponds to the selected criterion. Then, in step 120, it compares the two authentication results RES1 and XRES1. If these results are the same, the access to the telecommunications network is authorized for the criterion C. The operation is thus resumed at step 13 to verify whether the access is also authorized as a function of other criterions. On the other hand, if the two results are different, the access is denied to the base unit and the communication is terminated in step 40.

In this embodiment, the access code corresponding to a criterion is asked from the user for the start of the communication.

In another embodiment, another type of criterion is defined for which the is cyclically asked for the access code. Such a criterion notably permits of checking the duration of the communications. An elementary duration is defined beyond which the user is to enter the access code that corresponds to this criterion. If the code entered is correct, the communication is continued, the user thus being conscious of the elapsed time. On the other hand, if the code is not correct, this means that the user is not authorized to carry on with this communication beyond this elementary duration, and the communication is shut off.

Although the invention has been described within the scope of the DECT standard, it is not restricted thereto. It may notably be used in any telecommunications system in which a user authentication procedure is provided.

Furthermore, the invention is not restricted to the embodiments which have just been described by way of example. Variants may be provided notably by substituting equivalent technical means.

What is claimed is:

1. A process for restricting access of a telecommunication network by a mobile unit to place a call as a function of predefined criterions for each call comprising:

storing in said telecommunication network predefined access codes corresponding to each of said predefined criterions;

providing said telecommunication network with a first authentication code calculated by said mobile unit from inputs of a user of said mobile unit;

calculating a second authentication code by said telecommunication network using said predefined access codes;

determining access of said mobile unit to said telecommunication network based on comparison of said first authentication code with said second authentication code and allowing said access if said comparison is favorable; and cyclically repeating the acts of providing, calculating and determining during said call, and shutting off said access if said comparison is not favorable.

2. The process of claim 1, wherein said telecommunication network is implemented in accordance with a DECT standard to restrict said access using a user authentication defined by said DECT standard.

3. The process of claim 1, further comprising prior to the providing act, requesting by said telecommunication network from said mobile unit an authentication request, wherein the providing act is performed in response to the requesting act, and wherein the requesting act is cyclically repeated with the acts of providing, calculating and determining during said call.

4. The process of claim 3, wherein the requesting act is performed in response to a call request from said mobile unit.

5. A telecommunication system comprising:

a telecommunication network which stores predefined access codes corresponding to each of predefined criterions for each call;

a mobile unit to place a call through said telecommunication network;

wherein said telecommunication network restricts communication access of said mobile unit as a function of said predefined criterions;

said mobile unit providing said telecommunication network with a mobile authentication code calculated by said mobile unit from inputs of a user of said mobile unit; and said telecommunication network calculating a network authentication code using said predefined access codes, and determining said communication access of said mobile unit based on a comparison of said mobile authentication code with said network authentication code and allowing said communication access if said comparison is favorable;

wherein said telecommunication network cyclically determines said communication access during said call by cyclically requesting new mobile authentication codes from said mobile unit calculated from new input of said user, comparing said new mobile authentication codes with new network authentication codes, and shutting off said communication access if said new mobile authentication codes are not equal to said new network authentication codes.

6. The telecommunication system of claim 5, wherein said telecommunication system is in conformity with a DECT standard to restrict said communication access using a user authentication defined by said DECT standard.

7. The telecommunication system of claim 5, wherein said mobile unit provides said telecommunication network with said mobile authentication code in response to an authentication request from said telecommunication network.

8. The telecommunication system of claim 7, wherein said telecommunication network provides authentication request in response to a call request from said mobile unit.

9. A central telecommunication unit comprising:

means for storing predefined access codes corresponding to each of predefined criterions for each call;

means for restricting call placement by a mobile unit through a telecommunication network as a function of said predefined criterions;

means for calculating a network authentication code using said predefined access codes, and determining means for determining communication access of said mobile unit based on a comparison of said network authentication code with mobile authentication codes calculated by said mobile unit from inputs of a user of said mobile unit and allowing said communication access if said comparison is favorable;

wherein said determining means cyclically determines said communication access during a communication by cyclically requesting new mobile authentication codes from said mobile unit, said determining means comparing said new mobile authentication codes with said second authentication code during said communication, and said mobile unit calculating said new authentication codes in response to new inputs from said user of said mobile unit during said communication, said determining means shutting off said communication access if said new mobile authentication codes are not equal to said second authentication code.

10. The central telecommunication unit of claim 9, wherein said central telecommunication unit and said mobile unit are in conformity with a DECT standard to restrict said communication access using a user authentication defined by said DECT standard.

11. The central telecommunication unit of claim 9, wherein said means for restricting call placement requests an authentication request in response to a call request from said mobile unit.

* * * * *